Patented Feb. 27, 1951

2,543,094

UNITED STATES PATENT OFFICE 2,543,094

PROCESS FOR POLYMERIZING VINYLIDENE COMPOUNDS

Cyril Alfred Brighton, Watford, and Johann Josef Peter Staudinger, Ewell, England, assignors to The Distillers Company, Limited, Edinburgh, Scotland, a British company No Drawing. Application July 8, 1947, Serial No. 759,720. In Great Britain June 5, 1946

Section 1, Public Law 690, August 8, 1946
Patent expires June 5, 1966

3 Claims. (Cl. 260—45.2)

This invention relates to the production of polymerisation products from compounds containing the group $CH_2=C(halogen)$—hereinafter referred to as halogen-ethenoid compounds.

It is well known that halogen-ethenoid compounds, such as vinyl chloride and vinylidene chloride, can be polymerised in aqueous emulsion or dispersion and it has already been proposed to use, in such processes, water-soluble salts of long-chain sulphated or sulphonated fatty alcohols as dispersing agents, a capacity in which such compounds have already been used in many other fields.

An object of the present invention is to provide an improved process for the production of polymerisation products from halogen-ethenoid compounds, whereby products with improved properties are obtained.

According to the present invention, there is provided a process for the production of polymerisation products from halogen-ethenoid compounds which comprises polymerising one or more of the said compounds while dispersed in water containing a water-soluble urea-formaldehyde condensation product.

In addition to the halogen-ethenoid compound, other compounds which are capable of copolymerisation therewith, for example, organic vinyl esters, and acrylic acid derivatives, may also be present in the dispersion.

The water-soluble urea-formaldehyde condensation product is formed in well-known manner by heating urea and formaldehyde in aqueous solution, with or without the addition of an alkaline condensing agent until the initial water-soluble condensation product is formed.

It is found that the water-soluble urea-formaldehyde condensation product acts as a dispersing agent but, if desired, one or more of the previously-proposed dispersing agents, such as water-soluble salts of long-chain sulphated or sulphonated fatty alcohols may also be present, a greater or less proportion being added according to the stability of the emulsion or dispersion which is desired. In general, it is preferred to carry out the polymerisation in a two phase system which is not stable and in which a state of dispersion is only maintained by continual stirring. This avoids the preliminary operation of homogenising and the subsequent lengthy operation of washing-out the relatively high proportion of the previously proposed dispersing agents which are necessary to the formation and maintenance of a stable dispersion. When carrying out the process of the present invention under those preferred conditions, it is found that concentrations of urea-formaldehyde condensation product of from 0.5 to 10%, preferably 1 to 5%, by weight of the aqueous phase are sufficient and ensure good dispersion with the aid of continual stirring during polymerisation.

As some of the urea-formaldehyde water-soluble product is converted, during polymerisation, to an insoluble form, the dispersing effect is gradually reduced. If the initial concentration of the water-soluble product used is high (within the suitable concentrations mentioned above) sufficient of the water-soluble product remains unchanged throughout the polymerisation to ensure good dispersion. If, however, the initial concentration is low, it may be desirable to add further small quantities of the urea-formaldehyde water-soluble product at intervals during polymerisation. Alternatively, one or more of the previously-proposed dispersing agents, such as salts of long-chain alkyl acid sulphates or sulphonates may be added at the start or during polymerisation in a proportion of less than 0.5% by weight of the aqueous phase, that is insufficient to form a stable emulsion but enough to ensure good dispersion even after most of the water-soluble urea-formaldehyde product has become insolubilised.

If, however, it is desired to effect polymerisation in a two-phase system under conditions of relative stability, much higher proportions of the already-known dispersing agents will be necessary in addition to the urea-formaldehyde water-soluble condensation product. In this case, also, suitable concentrations of the latter product are from 0.5 to 10% by weight of the aqueous phase.

Polymerisation results on warming the mixture to a temperature between 20° and 60° C. with or without the usual oxygen-supplying catalysts, either of the water-soluble or oil-soluble type and with or without exposure to actinic light. Other compounds, known to initiate the polymerisation may also be used.

When polymerisation is completed, if, as in the preferred embodiment, the dispersion is not stable, stirring is stopped whereupon the polymer settles out and is separated from the aqueous phase. As the addition of a coagulant is not necessary in this case, there are obvious advantages, for instance, the avoidance of the formation of insoluble salts which would otherwise have to be removed. If, however, a stable emulsion has been used, the emulsion may be broken in well-known manner, for example, by the addition of acid salts.

It is found that the separated product requires very little after-treatment in order to free it from impurities, simple washing with warm water being sufficient to remove the remaining catalyst or dispersing agent of the sulphated fatty alcohol type if such has been added.

As mentioned above, part or all of the water-soluble urea-formaldehyde condensation product which had been initially added may be converted to the insoluble form during the polymerisation process. Any water-soluble urea-formaldehyde product which remains in the polymerised product after washing is converted to the insoluble form on drying, which as is already known, has a plasticising effect on the resulting polymer. The heat stability of the polymerisation product of the present invention is better than that of polymerisation products formed from these monomers by emulsion processes in the absence of the water-soluble urea-formaldehyde condensation products.

The following examples illustrate the manner in which the present invention may be carried into effect.

*Example 1.*—A mixture of 880 g. of pure vinylidene chloride with 100 g. vinyl chloride and 20 g. acrylo-nitrile was charged into a glass-lined pressure vessel fitted with a stirrer and containing 3 litres of an aqueous solution containing 2.5% by weight of a water-soluble urea-formaldehyde condensation product. 1 g. of benzoyl peroxide and 3 g. ammonium persulphate were added as catalysts. The polymerisation was carried out with constant agitation, by heating at 45° C., the reaction being substantially complete in 68 hours. The product was in the form of a free-flowing dispersion, which was filtered and the polymer then washed with warm water. The final material after drying completely passed a 100 mesh sieve, and on pressing at 170° C. with 10% by weight of distyrene, gave a light coloured clear disc.

*Example 2.*—1000 g. of vinylidene chloride was charged into a glass-lined pressure vessel containing 2 litres of an aqueous solution containing 2% by weight of a water-soluble urea-formaldehyde condensation product and 0.3% by weight of the sodium salt of sulphated cetyl alcohol. 40 g. of acetic acid and 3 g. ammonium persulphate were also added, giving an initial pH of 3. The mixture was continuously agitated and heated at 40° C. and polymerisation was substantially complete in 50 hours, the pH of the aqueous phase having dropped to 2.1. The product was in the form of a freely flowing dispersion, from which the polymer was filtered off and washed with warm water. This polymer (with the addition of 15% by weight of tricresyl phosphate) could be moulded at 185° C. into light-coloured objects. A polymer prepared in emulsion under the same conditions but without the urea-formaldehyde condensation product had a greatly inferior heat stability and, on moulding under similar conditions, gave very discoloured articles.

*Example 3.*—1000 g. of vinyl chloride was distilled into a glass-lined pressure vessel containing 2 litres of an aqueous solution containing 3% by weight of a water-soluble urea-formaldehyde condensation product, 2 g. of potassium persulphate and 1 g. of crotonyl peroxide. The mixture was agitated continuously and heated at 50° C., and polymerisation was substantially complete in 25 hours. The polymer was produced as a fine powder which was filtered off, washed and dried. On plasticisation with 30% by weight of dioctyl phthalate and manipulation on rolls, it proved to have greatly improved heat stability, the addition of an external stabiliser proving unnecessary.

*Example 4.*—A mixture of 900 g. vinylidene chloride and 100 g. vinyl chloride was charged into a glass-lined pressure vessel together with 3 litres of an aqueous solution of 1.0% by weight of a water-soluble urea-formaldehyde condensation product, containing 2 g. of ammonium persulphate. The mixture was heated to 45° C. with continuous agitation; after 10 hours, a further 15 g. urea-formaldehyde was added and then after 20 hours a further similar addition was made. The polymerisation was substantially complete after 30 hours when the polymer, which was formed as a fine powder, was filtered off and washed. The polymer proved to have excellent properties and better heat stability than those copolymers prepared by the usual methods.

*Example 5.*—The following stock solution was made up and used as aqueous phase in two polymerisation reactions:

250 cc. distilled water.
7.5 g. water-soluble urea-formaldehyde condensation product.
0.1 g. triethanolamine.
0.25 g. sodium hydrosulphite.

The details of the two experiments were as follows:

| Exp. | Catalyst | Volume of aqueous phase | Vinylidene chloride | Other monomers | Yield |
|---|---|---|---|---|---|
| | | Cubic centimeters | Grams | | Grams |
| 1 | 0.03 g. o-toluyl peroxide. | 30 | 13.5 | 1.5 g. diethyl itaconate. | 11.3 |
| 2 | 0.03 g. o-toluyl peroxide. | 30 | 15.0 | | 12.51 |

Polymerisation was effected in each case by heating at 40° C. for 63 hours with continual agitation, and the resulting fine granular products filtered off and washed with distilled water. The copolymer obtained in Experiment 1 readily gave a 10% by weight solution whereas the pure polyvinylidene produced in Experiment 2 only swelled in the same solvent.

We claim:

1. The process as set forth in claim 3 in which said monomeric material contains a minor proportion of vinyl chloride.

2. The process as set forth in claim 1 in which said monomeric material also contains a minor proportion of acrylonitrile.

3. A process of polymerisation which comprises polymerising an aqueous dispersion of a monomeric polymerisable material containing at least 88% by weight of vinylidene chloride and a water-soluble urea-formaldehyde condensation product as dispersing agent in an amount of 0.5 to 10% by weight of the monomeric material.

CYRIL ALFRED BRIGHTON.
JOHANN JOSEF PETER STAUDINGER.

REFERENCES CITED

The following references are of record in the file of this patent:

UNITED STATES PATENTS

| Number | Name | Date |
|---|---|---|
| 2,279,436 | Berg | Apr. 14, 1942 |
| 2,296,427 | Daniel et al. | Sept. 22, 1942 |
| 2,404,791 | Coffman et al. | July 30, 1946 |